United States Patent Office 3,776,901
Patented Dec. 4, 1973

3,776,901
REACTION OF KETOXIMES WITH CARBOXYLIC ACID AMIDE-SULFUR TRIOXIDE COMPLEXES
Kenneth K. Kelly, Franklin Township, Westmoreland County, and Joseph S. Matthews, O'Hara Township, Allegheny County, Pa., assignors to Gulf Research & Development Company, Pittsburgh, Pa.
No Drawing. Filed Apr. 1, 1968, Ser. No. 717,967
Int. Cl. C07d 41/06
U.S. Cl. 260—239.3 A
17 Claims

ABSTRACT OF THE DISCLOSURE

A method for converting a ketoxime to an N-substituted amide by reacting a ketoxime with a complex of an N-substituted carboxylic acid amide and sulfur trioxide to form a novel compound of the ketoxime, carboxylic acid amide and sulfur trioxide and decomposing this compound to produce an N-substituted amide corresponding to the ketoxime. Cyclohexanone oxime is converted to caprolactam.

---

This invention relates to the production of N-substituted carboxylic acid amides from ketoximes by reacting the ketoxime with a complex of a carboxylic acid amide and sulfur trioxide and it further relates to the preparation of a novel compound of a ketoxime, a carboxylic acid amide and sulfur trioxide.

The rearrangement of ketoximes to amides is well known in the literature as the Beckmann rearrangement. This reaction is widely used not only as a commercial method for the production of amides, but also as a tool for the determination of the structure of ketones. The Beckmann rearrangement reaction is thoroughly treated in Organic Reactions, vol. II, edited by Adams et al. (John Wiley & Sons, Inc., 1960) at pages 1 to 156. In this reaction the rearrangement of the ketoxime is usually directly brought about by a rearranging agent, often called a catalyst, frequently in an appropriate solvent over a wide variety of conditions in part dependent upon the nature of the ketoxime, the nature of the product; the catalyst; the solvent, if any, the nature of the reactor; the nature of added materials such as inorganic salts, etc. The rearranging agents or catalysts are generally acids including Lewis acids, common catalysts being concentrated sulfuric acid, phosphorous pentachloride in ether and hydrogen chloride in a mixture of acetic acid and acetic anhydride. When sulfuric acid is used, the acid is neutralized after the reaction so that a producer of an amide by the Beckmann rearrangement produces a much greater quantity of sodium sulfate or ammonium sulfate than the desired amide. Possible side reactions include hydrolysis of the ketoxime to the ketone, hydrolysis of the product amide to the corresponding amine and acid, the rearrangement of the ketoxime to a nitrile, etc.

The reaction of ketoximes with sulfur trioxide is vigorous and is capable of running away with explosive violence. This is true, for example, with cyclohexanone oxime which requires substantial amounts of sulfuric acid as a solvent and heat sink. The neutralization of the sulfuric acid in the production of the caprolactam results in large quantities of the sulfate salt presenting a troublesome by-product problem.

We have discovered a method for carying out the Beckmann rearrangement reaction of ketoximes with good yields and in a smooth, relatively trouble-free manner by using a complex of a carboxylic acid amide and sulfur trioxide. In this reaction a compound, frequently designated herein as intermediate compound, of the ketoxime, sulfur trioxide and the carboxylic acid amide is first formed and this compound can then be dissociated or decomposed to produce the N-substituted amide of the ketoxime in good yield with substantially quantitative recovery of the sulfur trioxide and carboxylic acid amide which can be recomplexed for use with additional quantities of the ketoxime.

The ketoximes occur in the symmetrical form such as, for example, acetoxime and cyclohexanone oxime or in the unsymmetrical form such as acetophenone oxime. Both forms undergo the Beckmann rearrangement; however, the unsymmetrical ketoxime is capable of two stereoisomers, the syn configuration and the anti configuration. The Beckmann rearrangement of the unsymmetrical ketoxime involves a migration in the anti position. When a syn migration appears to have taken place, it is assumed that isomerization to the anti position occurred before rearrangement.

This reaction using the sulfur trioxide-carboxylic acid amide rearranging agent is general for ketoximes. This includes the aliphatic ketoximes, such as those having from three to about 30 carbon atoms, preferably from three to about 12 carbon atoms; the aliphatic-aromatic ketoximes, such as those having from eight to about 20 carbon atoms, preferably from eight to about 12 carbon atoms; the diaryl ketoximes, such as those having from 13 to about 20 carbon atoms, preferably from 13 to about 18 carbon atoms; the alicyclic ketoximes, such as those having from five to about 12 carbon atoms, preferably from about six to about 10 carbon atoms, etc. These ketoximes can contain substituted groups in the molecule including mononuclear and polynuclear aromatic groups such as phenyl, tolyl, xylyl, naphthyl, etc., halogen such as chlorine, bromine, iodine and fluorine; alkoxy such as methoxy, ethoxy, etc.; cycloaliphatic such as cyclohexyl, etc.; nitro, hydroxy, etc. The ketoxime can also be used in the substituted form including the oxime esters, the oxime ethers, etc. A listing of these ketoximes which have been subjected to Beckmann rearrangement is found on pages 59 to 151 in Organic Reactions, vol. II, supra.

We prefer dimethyl foramide as a complexing agent for the sulfur trioxide; however, any carboxylic acid monoamide or polyamide can be used, provided that the nitrogen contains at least one alkyl or aryl substitution in order to prevent its dehydration to the corresponding nitrile. The carboxylic acid moiety of the amide and each N-substituted group can contain from one to about 12 carbon atoms, preferably from one to about seven carbon atoms. Most of the amides which are useful herein as complexing agents can be defined by the formula $$R_1CONR_2R_3$$

where $R_1$ can be an amino or amido group; $R_1$, $R_2$ and $R_3$ can be hydrogen, an alkyl or aromatic group, each being the same or different with no more than one of $R_2$ and $R_3$ being hydrogen, or $R_1$ and $R_2$ or $R_2$ and $R_3$ can be joined together to form a closed ring with the carbonyl group and nitrogen or the nitrogen atom, respectively.

Examples of such carboxylic acid amides include monomethyl formamide, diethyl formamide, isopropyl formamide, dibutyl formamide, dipentyl formamide, monomethyl acetamide, dimethyl acetamide, diethyl acetamide, dimethyl propionamide, diethyl propionamide, monomethyl butyramide, monoethyl butyramide, dimethyl valeramide, diethyl valeramide, dipentyl valeramide, caprolactam, 6-methyl caprolactam, N,N-cyclopentyl formamide, N,N-cyclopentyl acetamide, etc. Additional examples of suitable amides for complexing with sulfur trioxide include tetramethyl urea, tetramethyladipamide, formylpiperidide, acetylpiperidide, formylmorpholide, tetramethyladipamide, dimethylbenzamide, dimethylurethane, N-methylacetanilide, N-methylphthalimide, dimethyldodecanoamide, N-dodecylformamide, etc. The sulfur trioxide being an electron acceptor will combine with the electron donor amides to form a complex, also known as an adduct. The sulfur trioxide can complex with the amide in the ratio of one mol of sulfur trioxide for each amido group. The reactivity of each sulfur trioxide-carboxylic acid amide complex for the reaction with the ketoxime is affected by the complexing strength of each carboxylic acid amide with the sulfur trioxide.

The carboxylic acid amide-sulfur trioxide complex can be prepared by adding the sulfur trioxide slowly to excess amide with stirring and cooling. The excess amide serves as a solvent or dispersing agent for the resulting complex. However, adequate mixing and temperature control is difficult to maintain, resulting in some oxidation of the amide, a large variation in particle size of the complex and lower than desired yields. We prefer to use a suitable hydrocarbon solvent preferably a halogenated hydrocarbon such as methylene chloride, ethylene dichloride, etc., for the amide during reaction with the sulfur trioxide which can also function as a solvent or dispersing agent for the amide-sulfur trioxide complex in the reaction with the ketoxime.

It is desirable to carry out the reaction of the ketoxime and the sulfur trioxide-carboxylic acid amide complex in the presence of a solvent. Suitable solvents include the halogenated hydrocarbons preferably those containing from one to about 12 carbon atoms, aromatic solvents preferably containing from six to about 12 carbon atoms, the alcohols preferably those containing from one to about 12 carbon atoms, the paraffins preferably those containing from about five to about 12 carbon atoms, and the ethers preferably those containing from about four to about 10 carbon atoms. Also useful as solvents are the amines preferably those containing from about three to about 10 carbon atoms, the ketones preferably those containing from three to about 10 carbon atoms, the liquid amides preferably those containing from one to about 12 carbon atoms, the esters preferably those containing from about three to about 12 carbon atoms, the cyclic straight or branched olefins preferably those containing from about five to about 12 carbon atoms, such as pentene-1, cyclohexene, decene-3, etc.; water; etc.

We have found that it is preferable to add the ketoxime to a solution of the sulfur trioxide-amide complex rather than the reverse order of addition for the highest yields. We have discovered that two compounds of the ketoxime with the sulfur trioxide-amide complex can be produced, a one-to-one and a two-to-one molar ratio of ketoxime to sulfur trioxide-amide complex. In making these compounds the ketoxime is slowly added to the sulfur trioxide-amide complex until one mol of ketoxime has been added for each mol of the complex for the first compound or the addition of ketoxime is continued until two mols of ketoxime have been added for each mol of the complex for the second compound. If less than one mol of ketoxime is used, the reaction mixture will contain the one-to-one molar ratio compound and unreacted sulfur trioxide-amide complex. When more than one but less than two mols of the ketoxime are used, the reaction mixture will include both the one-to-one and the two-to-one molar ratio compounds. When more than two mols of the ketoxime are used, the reaction mixture will include unreacted ketoxime and the two-to-one molar ratio compound.

The temperature at which this reaction will conveniently take place varies depending on several factors including the nature of the ketoxime, the solvent, the amide complexing agent, etc. It is preferred to use as low a temperature as practically feasible to avoid possible decomposition of the organic compounds by the sulfur trioxide moiety. These reactions generally can be conducted between about 0° C. and about 60° C., but we prefer to carry them out at a temperature from about 20° C. to about 45° C.

These two novel intermediate compounds can be isolated by removing the solvent at reduced pressure and are represented by the following: $(RR')C=NOSO_3H \cdot amide$ and $[(RR')C=NO]_2 \cdot amide$ where R and R' are the same or different organic groups such as specified above or they can be joined together in an alicyclic ring and the amide is an amide such as specified above. For example, the intermediate compound formed from one mol of cyclohexanone oxime and one mol of sulfur trioxide-dimethylformamide complex is represented by

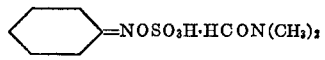

while the two-to-one intermediate compound is represented by

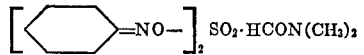

These intermediate compounds are relatively stable at room temperature with substantially enhanced stability at 0° C. When the N-substituted amide corresponding to the ketoxime is the desired end product, it is preferred to decompose the intermediate compound to the N-substituted amide relatively soon after the preparation of the intermediate to avoid its deterioration or to avoid any need to chill it.

The ketoxime moiety of these intermediate compounds can be converted to the N-substituted amide by pyrolysis of the intermediate. This pyrolysis reaction also releases the sulfur trioxide and its amide complexing compound in substantially quantitative yield for recovery and further use. The pyrolysis of the intermediate compounds can be carried out in the presence of or after removal of the reaction solvent. For example, the intermediate compound-solvent mixture can be passed through a heated zone at such conditions to vaporize the solvent and induce the pyrolysis of the intermediate compound and the vaporization of the components of the decomposition—the N-substituted amide, the sulfur trioxide and the amide complexing agent. It is desirable to quickly cool this stream preferably in a suitable solvent in order to reduce the oxidative decomposition of the organic compounds by the highly reactive sulfur trioxide. The intermediate compound can also be pyrolyzed after removal of the solvent. For example, a small quantity of the intermediate compound is heated with an immersion heater to initiate the reaction which will then continue as a result of the exothermic heat of reaction. The pressure is preferably reduced from atmospheric to subatmospheric pressure after the reaction has been initiated to remove the highly reactive sulfur trioxide from the reaction zone.

The intermediate compound can also be hydrolyzed in a basic media such as sodium hydroxide, potassium hydroxide or ammonia. However, some intermediate compounds will produce the N-substituted amide upon basic hydrolysis while others will regenerate the initial ketoxime. The direction that this basic hydrolysis takes appears to be dependent upon the structure of the initial ketoxime and the amide complexing agent. For example, the specific examples will show that the intermediate compound formed from cyclohexanone oxime, dimethylformamide and sulfur trioxide will regenerate cyclohexanone oxime upon basic hydrolysis; the intermediate compound formed from 2-methylcyclohexanone oxime, dimethylformamide and sulfur trioxide will produce a mixture of methyl-substituted caprolactams upon basic hydrolysis; and the intermediate compound resulting from cyclohexanone oxime, N,N-dimethylbutyramide and sulfur trioxide will yield caprolactam upon basic hydrolysis.

The following specific examples are merely illustrative of our invention and are set forth without any intention of limiting the invention.

EXAMPLE 1

A 50 weight percent solution consisting of 100 grams of dimethylformamide in 75 cc. of methylene chloride was placed in a round-bottom flask fitted with a cold finger condenser with a drying tube to serve as a relief valve. This solution was cooled to about 0° C. in an ice bath. An equimolar amount (50 cc.) of stabilized liquid sulfur trioxide was slowly added to the solution by a pressure equalizing dropping funnel over a period of 45 minutes. After the completion of the addition of the sulfur trioxide, the white crystalline precipitate of dimethylformamide-sulfur trioxide complex was filtered off from the methylene chloride and vacuum dried resulting in a one-to-one molar complex of dimethylformamide and sulfur trioxide in substantially theoretical yield.

EXAMPLE 2

Crystalline dimethylformamide-sulfur trioxide complex (containing 0.0177 mol of sulfur trioxide) as produced in Example 1 was placed in a 100 ml. round-bottom flask together with 5.0 ml. of methylene chloride. This mixture was slurried with the aid of a magnetic stirring bar and was maintained at 40° C. by means of a constant temperature bath. Cyclohexanone oxime (0.0177 mol) was dissolved in 5.0 ml. of methylene chloride and was added to the slurry in the flask, using a pressure equalizing dropping funnel, at a rate of 2 ml. per minute with rapid stirring of the contents of the flask. After completion of the reaction, the methylene chloride was removed from the reaction mixture by evacuating the flask to 3 mm. Hg at 25° C. over a one-half hour period. The light yellow viscous oil remaining in the flask was determined to be

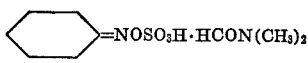

by nuclear magnetic spectroscopy and infrared spectroscopy in substantially 100 percent yield.

EXAMPLE 3

The procedure of Example 2 was followed except that twice the amount (0.0354 mol) of cyclohexanone oxime was added to 0.0177 mol of dimethylformamide-sulfur trioxide complex. After removal of the methylene chloride, the intermediate product

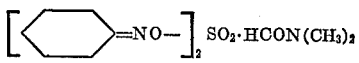

was recovered in substantially 100 percent yield.

EXAMPLE 4

The product of Example 2 was cooled to 0° C. at atmospheric pressure. An electric immersion heater was inserted into the main bulk of the material and electricity applied momentarily to initiate the pyrolysis reaction. This reaction proceeded on its own due to the exothermicity of the decomposition. Immediately after the onset of the pyrolytic reaction the pressure was rapidly lowered to three mm. Hg to remove liberated sulfur trioxide and prevent its reaction with the organic components. The pyrolyzed product was determined by gas chromatography to be caprolactam in 93 percent yield based on starting cyclohexanone oxime.

EXAMPLE 5

Another sample of the intermediate product produced according to the procedure of Example 2 together with about 65 weight percent of methylene chloride was injected as a liquid through a tube, a short section of which was heated to about 260° C., such that the liquid contacted the heated portion of the tube for only a fraction of a second. The liquid was immediately vaporized and the intermediate product pyrolyzed. By immediate chilling in cool methylene chloride, the sulfur trioxide and dimethylformamide recomplexed and precipitated out of the methylene chloride-caprolactam solution. The caprolactam was recovered by filtration of the regenerated complex and distillation of the filtrate.

EXAMPLE 6

The product of Example 3 was pyrolyzed in the same manner as used in Example 4, except that the intermediate product was initially heated to about 50° C. prior to activation of the resistance heater in order to permit the pyrolysis reaction to be self-sustaining. Analysis of the final product by gas chromatography disclosed it to be caprolactam in 80 percent yield based on initial cyclohexanone oxime.

EXAMPLE 7

Cyclohexanone oxime was reacted with a complex of sulfur trioxide and dimethylformamide to produce the intermediate according to the procedure of Example 2. The intermediate product, freed of methylene chloride, was treated with gaseous ammonia by bubbling it through the liquid intermediate product. The products of this reaction were determined to be cyclohexanone oxime, dimethylformamide and ammonium sulfate. In other experiments the same intermediate product was separately treated with ammonium hydroxide and potassium hydroxide with the same result.

EXAMPLE 8

Equimolar amounts of cyclohexanone oxime and a complex of N-methylacetamide and sulfur trioxide were reacted as in Example 2 to produce the intermediate product

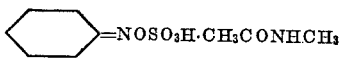

This intermediate was pyrolyzed as in Example 5 and the product was identified as caprolactan.

EXAMPLE 9

The reaction of Example 8 was repeated and the intermediate product was treated with ammonia gas as in Example 7. There resulted cyclohexanone oxime, N-methylacetamide and ammonium sulfate.

EXAMPLE 10

Equimolar amounts of cyclohexanone oxime and a complex of N,N-dimethylacetamide and sulfur trioxide were reacted as in Example 2 to produce an intermediate product having the formula

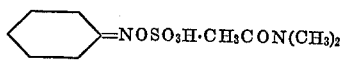

The intermediate was pyrolyzed as in Example 5 and the product was identified as caprolactam.

EXAMPLE 11

The reaction of Example 10 was repeated and the intermediate product was treated with ammonia gas as in Example 7. Cyclohexanone oxime, N,N-dimethylacetamide and ammonium sulfate were recovered from this reaction.

EXAMPLE 12

Equimolar amounts of cyclohexanone oxime and a complex of N,N-dimethylbutyramide and sulfur trioxide were reacted as in Example 2 to produce an intermediate product having the formula

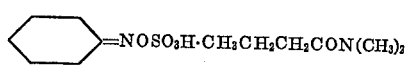

This intermediate was pyrolyzed as in Example 5 to caprolactam.

EXAMPLE 13

The reaction of Example 12 was repeated and the intermediate product was treated with ammonia gas as in Example 7. Caprolactam was recovered as the product of this reaction.

EXAMPLE 14

Equimolar amounts of cyclohexanone oxime and a complex of N,N-dimethylbenzamide and sulfur trioxide were reacted as in Example 2 to produce an intermediate product having the formula

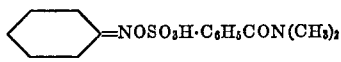

This intermediate was pyrolyzed as in Example 5 and the product was identified as caprolactam.

EXAMPLE 15

The reaction of Example 14 was repeated and the intermediate product was treated with ammonia gas as in Example 7 and caprolactam was the resulting product.

EXAMPLE 16

Equimolar amounts of acetoxime and dimethylformamide-sulfur trioxide complex were reacted following the procedure of Example 2 to produce the intermediate product, $(CH_3)_2C=NOSO_3H \cdot HCON(CH_3)_2$. Separate samples of this intermediate material were pyrolyzed and treated with ammonia following the procedure of Examples 5 and 7, respectively. The product in both cases were N-methylacetamide.

EXAMPLE 17

Equimolar amounts of acetophenone oxime and dimethylformamide-sulfur trioxide complex were reacted following the procedure of Example 2 to produce the intermediate product, $$(C_6H_5)(CH_3)C=NOSO_3H \cdot HCON(CH_3)_2$$

A sample of this intermediate product was pyrolyzed and another sample was treated with ammonia following the procedure of Examples 5 and 7, respectively. The final product in both cases was acetanilide.

EXAMPLE 18

Equimolar amounts of 2-methylcyclohexanone oxime and dimethylformamide-sulfur trioxide complex were reacted according to the procedure of Example 2 to produce the intermediate product

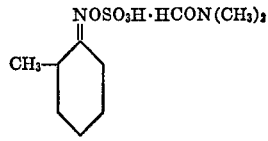

A sample of this intermediate product was pyrolyzed and another sample was treated with ammonia following the procedure of Examples 5 and 7, respectively. Both procedures for the decomposition of the intermediate resulted in a mixture of 2-methyl-6-caprolactam and 6-methyl-6-caprolactam.

EXAMPLE 19

Equimolar amounts of 2-(n)butylcyclohexanone oxime and dimethylformamide-sulfur trioxide complex were reacted in the same manner as the reaction of Exapmle 2 producing the intermediate product.

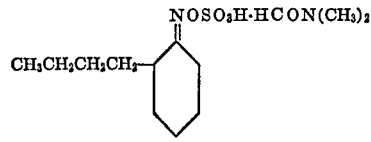

A sample of this intermediate was pyrolyzed and another sample was treated with ammonia following the procedure of Examples 5 and 7, respectively. The product in both cases was 6-(n)butyl-6-caprolactam.

EXAMPLE 20

Equimolar amounts of caprolactam and sulfur trioxide were reacted in accordance with the procedures of Example 1 to produce a complex of caprolactam and sulfur trioxide. Equimolar amounts of this sulfur trioxide-caprolactam complex and cyclohexanone oxime complex are reacted in accordance with the procedures of Example 2 producing the intermediate compound

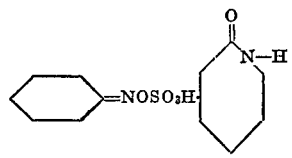

Pyrolysis of this compound in accordance with the procedures of Example 5 produces caprolactam resulting from the initial cyclohexanone oxime in addition to the caprolactam used in the complex.

EXAMPLE 21

Cyclohexanone oxime and sulfur trioxide-caprolactam complex are reacted in accordance with the procedures of Example 3 using a two-to-one molar ratio of the ketoxime to the complex producing the intermediate compound

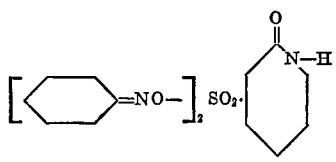

Pyrolysis of this compound in accordance with the procedures of Example 5 produces caprolactam resulting from the initial cyclohexanone oxime in addition to the caprolactam used in the complex.

It is well recognized that not all ketoximes will submit to the Beckmann rearrangement reaction in the presence of any specific rearranging agent. The following two examples illustrate one ketoxime which did not undergo reaction under the procedures illustrated herein and another reaction which produced the N-substituted amide as a minor product.

EXAMPLE 22

Equimolar amounts of dimethylformamide-sulfur trioxide complex and 2-(1-cyclohexenyl)cyclohexanone oxime are reacted following the procedures of Example 2. The product analyzed 65 percent 5-cyano-1-(1-cyclohexenyl)-1-pentene, 23 percent 6-(1-cyclohexenyl)-6-caprolactam and the remainder was unidentified.

EXAMPLE 23

Equimolar amounts of dimethylformamide-sulfur trioxide complex and 2-(1-chlorocyclohexyl)cyclohexanone oxime were subjected to the procedures of Example 2. No reaction occurred and all of the starting oxime was recovered.

EXAMPLE 24

The procedures of Example 2 were followed in a series of experiments using equimolar amounts of cyclohexanone oxime and dimethylformamide-sulfur trioxide complex except that different solvents were used. The intermediate products in each experiment were pyrolyzed according to the procedure of Example 5 and in each instance caprolactam was produced. The solvents that were successfully used herein include chloroform; 2-chlorooctane; 1-fluorooctane; 1,1-dichloroethane; 1,1,1-trichloroethane; 1,4-dibromobutane; 1,3-diiodopropane; cis-1,2-dichloroethylene, trans-1,2-dichloroethylene; dibromodifluoroethane; trichloroethylene; 1,2-dichloroethane; 1-iodobutane; ethylene bromide; and 1-fluorohexane. Also successfully used herein as solvents were benzene, toluene, mesitylene, mixed xylenes, methanol, ethanol, n-octanol, cyclohexanol, n-hexane, cyclohexane, n-octane, isooctane, diethyl ether, di(n)butyl ether, bis(2-methoxyethyl) ether, tetrahydrofuran, hexylamine, aniline, cyclohexylamine, acetone, cyclohexanone, formamide, ethyl acetate and water.

In like manner by reacting the ketoxime with an amide-sulfur trioxide complex and decomposing the intermediate product the following overall reactions take place, methyl isopropyl ketoxime is rearranged to N-isopropylacetamide, di-n-propyl ketoxime is rearranged to N-n-propyl-n-butyramide, methyl n-hexyl acetamide is rearranged to N-n-hexylacetamide, ethyl cyclohexyl ketoxime is rearranged to N-cyclohexylpropionamide, phenylacetone oxime is rearranged to N-benzylacetamide, methyl-n-nonyl ketoxime is rearranged to N-nonylacetamide; and 10-nonacosanone oxime is rearranged to N-nonyleicosanamide. Further palmitone oxime is rearranged to N-n-pentadecylpalmitamide, syn-styryl-p-phenetyl ketoxime is rearranged to N-p-phenetylcinnamamide, 2-carboxybenzophenone oxime is rearranged to phthalanilide, 2,4-dimethylbenzophenone oxime is rearranged to 2,4-dimethylbenzanilide, cyclohexyl phenyl ketoxime is rearranged to N-cyclohexylbenzamide, and benzyl phenyl ketoxime is rearranged to phenylacetanilide. Additionally, benzophenone oxime is rearranged to benzanilide, 4,4'-dichlorobenzophenone oxime is rearranged to 4,4'-dichlorobenzanilide, 2-hydroxybenzophenone oxime is rearranged to salicylanilide, 2-carboxybenzophenone oxime is rearranged to phthalanilide, 2-methoxy-5-nitrobenzophenone oxime is rearranged to 2-methoxy-5-nitrobenzanilide, and di-1-naphthyl ketoxime is rearranged to N-1'-naphthyl-1-naphthamide. Also cyclopentanone oxime is rearranged to delta-valerolactam, 3,5-dimethylcyclohexanone oxime is rearranged to 4,6-dimethyl-6-caprolactam, 4-t-butylcyclohexanone oxime is rearranged to 4-t-butyl-6-caprolactam, 2-methylcyclopentanone oxime is rearranged to 5-methyl-5-valerolactam, 2-ethylcyclopentanone oxime is rearranged to 5-ethyl-5-valerolactam, 3-methylcyclopentanone oxime is rearranged to 3-methyl-5-valerolactam and 4-methyl-5-valerolactam, 2-n-propylcyclopentanone oxime is rearranged to 5-n-propyl-5-valerolactam, and cycloheptanone oxime is rearranged to 2-oxoheptamethylenimine. Furthermore, 3-methylcyclohexanone oxime is rearranged to 3-methyl-6-caprolactam and 5-methyl-6-caprolactam, 4-methylcyclohexanone oxime is rearranged to 4-methyl-6-caprolactam, 2-ethylcyclohexanone oxime is rearranged to 6-ethyl-6-caprolactam, 3-ethylcyclohexanone oxime is rearranged to 5-ethyl-6-caprolactam, 4-ethylcyclohexanone oxime is rearranged to 4-ethyl-6-caprolactam, trans-2,4-dimethylcyclohexanone oxime is rearranged to 4,6-dimethyl-6-caprolactam, and trans-2,5-dimethylcyclohexanone oxime is rearranged to 3,5-dimethyl-6-caprolactam. In addition cyclooctanone oxime is rearranged to 2-oxooctamethylenimine, 2-isopropylcyclohexanone oxime is rearranged to 6-isopropyl-6-caprolactam, 2,3,5-trimethylcyclohexanone oxime is rearranged to 3,5,6-trimethyl-6-caprolactam, menthone oxime is rearranged to 3-methyl-6-isopropyl-6-caprolactam, 2-t-butyl-4-methylcyclohexanone oxime is rearranged to 4-methyl-6-t-butyl-6-caprolactam, cyclopentadecanone oxime is rearranged to 2-oxopentadecamethylenimine, etc.

The process described herein provides a general method for making the novel intermediate compounds described above. Furthermore, these novel intermediate compounds can be decomposed by pyrolysis or in most instances by basic hydrolysis to produce the N-substituted amide corresponding to the initial ketoxime. The pyrolysis of the intermediate compound is advantageous when the carboxylic acid amide and the sulfur trioxide are to be recovered for reuse in the reaction. The conditions of operation can be properly correlated with the reactants and solvent utilized in any specific operation in order to obtain optimum economic results from this reaction in accordance with the disclosure herein.

It is to be understood that the above disclosure is by way of specific example and that numerous modifications and variations are available to those of ordinary skill in the art without departing from the true spirit and scope of our invention.

We claim:
1. The process which comprises contacting a ketoxime selected from aliphatic ketoximes having from three to about 30 carbon atoms, aliphatic-aromatic ketoximes having from eight to about 20 carbon atoms, the carbocyclic diaryl ketoximes having from 13 to about 20 carbon atoms and the alicyclic ketoximes having from five to about 12 carbon atoms, said ketoximes optionally having substituted thereon phenyl, tolyl, xylyl, naphthyl, halogen, alkoxy, cyclohexyl, nitro and hydroxy with a complex of sulfur trioxide and an N-substituted carboxylic acid amide having the formula $R_1CONR_2R_3$ where $R_1$ can be an amino or amido group; $R_1$, $R_2$ and $R_3$ can independently be hydrogen, an alkyl or aromatic group, each having up to about 12 carbon atoms with no more than one of $R_2$ and $R_3$ being hydrogen, or $R_1$ and $R_2$ or $R_2$ and $R_3$ joined together to form a closed ring with the nitrogen atom or the carbonyl group and the nitrogen atom at a temperature between about 0° C. and about 60° C. whereby the ketoxime and the said complex of sulfur trioxide and an N-substituted carboxylic acid amide combine to form an intermediate product and heating the said intermediate product to an elevated temperature sufficient to effect pyrolysis of said intermediate product and thereby produce an N-substituted amide from the ketoxime-derived portion of said intermediate product.

2. A process in accordance with claim 1 in which the ketoxime is contacted with the sulfur trioxide carboxylic acid amide complex in a one-to-one molar ratio to produce the said product.

3. A process in accordance with claim 1 in which the ketoxime is contacted with the sulfur trioxide-carboxylic acid amide complex in a two-to-one molar ratio to produce the said product.

4. A process in accordance with claim 1 in which the ketoxime is cyclohexanone oxime and the complex is dimethylformamide-sulfur trioxide complex.

5. A process in accordance with claim 4 in which the cyclohexanone oxime and the dimethylformamide-sulfur trioxide complex are contacted in a one-to-one molar ratio to produce the said product.

6. A process in accordance with claim 4 in which the cyclohexanone oxime and the dimethylformamide complex are contacted in a two-to-one molar ratio to produce the said product.

7. A process in accordance with claim 4 in which caprolactam is produced from the cyclohexanone oxime.

8. A process in accordance with claim 1 in which the ketoxime is cyclohexanone oxime and the complex is caprolactam-sulfur trioxide complex.

9. A process in accordance with claim 8 in which the cyclohexanone oxime and the caprolactam-sulfur trioxide complex are contacted in a one-to-one molar ratio to produce the said product.

10. A process in accordance with claim 8 in which cyclohexanone oxime and the caprolactam-sulfur trioxide complex are contacted in a two-to-one molar ratio to produce the said product.

11. A process in accordance with claim 8 in which caprolactam is produced from the cyclohexanone oxime.

12. A process in accordance with claim 1 in which the reaction is carried out in the presence of a solvent.

13. A process for preparing at least one N-substituted amide which comprises heating a compound having the formula
   (a) $(RR')C=NOSO_3H \cdot R_1CON(R_2)(R_3)$, or
   (b) $[(RR')C=NO-]_2SO_2 \cdot R_1CON(R_2)(R_3)$,
   wherein
   (1) R and R' are independently selected from alkyl having from one to about 20 carbon atoms wherein (RR')C can be joined together in an alicyclic ring having from about five to about 12 carbon atoms and carbocyclic aralkyl having from seven to about 12 carbon atoms,
   (2) $R_1$ is selected from alkyl, amino and amido groups having from one to about 12 carbon atoms and carbocyclic aryl having from six to about 12 carbon atoms and (3) $R_2$ and $R_3$ are independently selected from hydrogen, alkyl having from one to about 12 carbon atoms and carbocyclic aryl having from six to about 12 carbon atoms with no more than one of $R_2$ and $R_3$ being hydrogen, wherein one of $R_1$ and $R_2$ together with the carbonyl group and the nitrogen or $R_2$ and $R_3$ together with the nitrogen can be joined together in a closed ring to an elevated temperature sufficient to effect pyrolysis of said compound and thereby produce an N-substituted amide from the ketoxime portion of said compound.

14. A process in accordance with claim 13 in which the said compound is

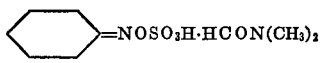

15. A process in accordance with claim 13 in which the said compound is

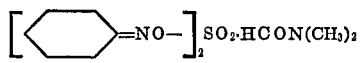

16. A process in accordance with claim 13 in which the said compound is

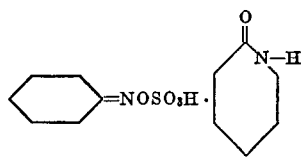

17. A process in accordance with claim 13 in which the said compound is

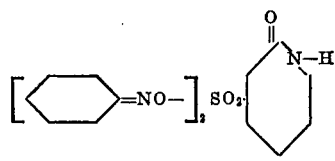

References Cited
UNITED STATES PATENTS

| | | | |
|---|---|---|---|
| 2,716,114 | 8/1955 | Blaser et al. | 260—239.3 |
| 2,716,115 | 8/1955 | Blaser et al. | 260—239.3 |
| 3,101,331 | 8/1963 | Turbak et al. | 260—239.3 |
| 2,221,369 | 11/1940 | Cass | 260—239.3 |
| 3,016,375 | 1/1962 | Hopkins et al. | 260—239.3 |

HENRY R. JILES, Primary Examiner

R. T. BOND, Assistant Examiner

U.S. Cl. X.R.

260—239.3 A, 326.5 FN, 558 R, 561 S, 561 R, 562 S, 562 R, 558 S, 566 A, 239.3 R, 293.73

PO-1050
(5/69)

UNITED STATES PATENT OFFICE
CERTIFICATE OF CORRECTION

Patent No. 3,776,901                        Dated December 4, 1973

Inventor(s) Kenneth K. Kelly and Joseph S. Matthews

It is certified that error appears in the above-identified patent and that said Letters Patent are hereby corrected as shown below:

Col. 1, line 64, "carying" should read --carrying--.

Col. 4, line 2, "$[(RR')C=NO]_2 \cdot$amide" should read

--$[(RR')C=NO]_2=SO_2 \cdot$amide--.

Col. 7, line 60, "Exapmle 2" should read --Example 2--.

Signed and sealed this 30th day of April 1974.

(SEAL)
Attest:

EDWARD M.FLETCHER,JR.
Attesting Officer

C. MARSHALL DANN
Commissioner of Patents